United States Patent Office 3,591,604
Patented July 6, 1971

3,591,604
DERIVATIVES OF DIBENZOXAZOCINE AND DIBENZTHIAZOCINE
Harry Louis Yale, New Brunswick, Francis Alexander Sowinski, Edison, and Jack Bernstein, New Brunswick, N.J., assignors to E. R. Squibb & Sons, Inc., New York, N.Y.
No Drawing. Continuation-in-part of application Ser. No. 346,407, Feb. 21, 1964, now Patent No. 3,454,598. This application Oct. 1, 1968, Ser. No. 764,320
Int. Cl. A61k 27/00; C07d 87/54, 93/00
U.S. Cl. 260—327B
3 Claims

ABSTRACT OF THE DISCLOSURE

Disclosed herein are derivatives of dibenzoxazocine and dibenzthiazocine which are active as ataractic agents.

This application is a division of U.S. application, Ser. No. 346,407, filed Feb. 21, 1964, now U.S. Pat. No. 3,454,-598.

This invention relates to the novel process of producing physiologically active substances of the formula

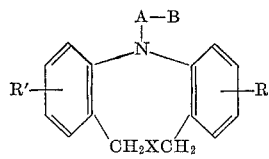

wherein R and R' are the same or different and represent hydrogen, halogen, lower alkyl, lower alkoxy, trifluoromethyl, trifluoromethylmercapto, trifluoromethoxy or N, N-dimethylsulfonamido; A is a lower alkylene radical; B is a basic saturated nitrogen containing radical of less than twelve carobn atoms, and X may represent oxo or thio.

Among the suitable radicals represented by the symbol B are: amino; (lower alkyl)amino; di(lower alkyl)amino; (hydroxy-lower alkyl)amino; di(hydroxy-lower alkyl) amino; and basic saturated 5- to 6-membered N-heterocyclic radicals of less than twelve carbon atoms, as exemplified by piperidyl [i.e., piperidino, 2 - piperidyl, 3- piperidyl and 4-piperidyl]; (lower alkyl)piperidyl [e.g., 2, 3, or 4 - (lower alkyl)piperidino or 2,3, or 4-(N-lower alkyl) piperidyl]; di(lower alkyl)piperidyl [e.g., 2,4- 2,5- or 3,5-di(lower alkyl)piperidino, or 2, 3, or 5-(N-lower alkyl) - 2, 3, or 4-(loweralkyl)piperidyl]; (lower alkoxy) piperidyl; pyrrolidyl; (lower alkyl)pyrrolidyl; di(lower alkyl)pyrrolidyl; (lower alkoxy) pyrrolidyl; morpholinyl [i.e., morpholino, 2-morpholinyl and 3-morpholinyl]; (lower alkyl)-morpholinyl; di(lower alkyl)morpholinyl; (lower alkoxy)morpholinyl; thiamorpholinyl; (lower alkyl)thiamorpholinyl; di(lower alkyl)thiamorpholinyl; (lower alkoxy)thiamorpholinyl; piperazyl; (lower alkyl) piperazyl (e.g., N⁴-methylpiperazino); di(lower alkyl)piperazyl; (lower alkoxy)piperazyl; (hydroxy lower alkyl)- piperazyl [e.g., N⁴-(2-hydroxy-ethyl)-piperazino]; (lower alkanoyloxy-alkyl)piperazyl [e.g., N⁴-(2 - acetoxyethyl)- piperazino]; (hydroxy-lower alkoxy-lower alkyl) piperazyl [e.g., N⁴-(2-hydroxyethoxyethyl)piperazino]; homopiperazine; and (carbo-lower alkoxy)-piperazyl [e.g., N⁴- (2-carbomethoxy, carboethoxy, or carbopropoxy)-piperazino]. The terms "lower alkyl," "lower alkoxy," and "lower alkylene," as employed herein, include both straight and branched chain radicals of less than eight carbon atoms.

As to salts of the compounds of this invention, those coming within the purview of this invention include the acid-addition salts, particularly, the non-toxic acid-addition salts. Acids useful for preparing the acid-addition salts include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

The compounds of this invention are therapeutically active compounds which are utilizable both as ataractic agents, and thus may be used in the treatment of depressed psychotic states, and as antihistamines. For these purposes they may be administered orally or parenterally in conventional dosage forms such as tablets, capsules, injectables or the like by incorporating the appropriate dose of the compound with carriers in a manner similar to the utilization of chlorpromazine.

The compounds of this invention are prepared by a series of reactions as shown by the following equations, wherein X, R, R', A and B are as hereinbefore defined; and Y is chloro or bromo:

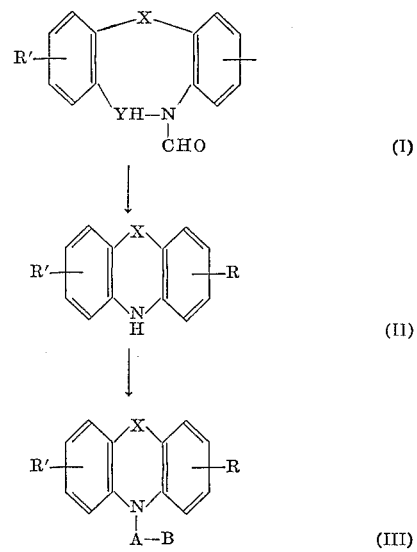

The compounds which may be employed as starting materials in the practice of the instant invention may be prepared in accordance with the teachings set forth in U.S. Pat. 3,069,432, or by conventional procedures known to the art.

The starting materials, (Compounds I) are then cyclized by treatment with an alkali metal salt of alkylene glycol, for example, sodium ethylene glycolate in a dihydroxy alcohol solvent, for example, ethylene glycol, at an elevated temperature to yield the 5-unsubstituted derivative (Compounds II).

Compound II is then treated with a basically substituted alkyl halide of the formula: B—A halide, wherein B and A are as hereinbefore defined, the reaction preferably being conducted in the presence of a basic condensation reagent such as sodamide or sodium hydride to yield the final products of this invention (Compounds I). The same compounds can alternatively be prepared in two steps, by first reacting with an alkylene dihalide of the formula: (halide)—A—(halide) and then with a base of the formula: BH. To prepare the acid-addition salts, the resulting base is treated with the desired acid in the usual manner.

The following examples are illustrative of the invention:

EXAMPLE 1

2-(o-bromobenzyloxy) formanilide

To a stirred mixture of 149.0 g. of o-bromobenzyl o- nitrophenyl ether, 270 g. of iron powder and 3.5 l. of 95% ethyl alcohol is added 25 ml. of concentrated hydrochloric acid. There is a mild exothermic reaction which is allowed to subside and heating is continued cautiously to reflux. After heating for one hour, the reaction mixture is filtered hot, concentrated until two phases appear, cooled and extracted with ether. Concentration of the dried ether extract affords about 101.1 g. of product, M.P. about 48–49°.

To a mixture of 169.0 g. of 98–100% formic acid and 73.5 g. of acetic acid is added in small portions while cooling and stirring, 101.1 g. of 2-(o-bromobenzyloxy) aniline. The reaction mixture is then gently refluxed for 0.5 hour, concentrated to dryness in vacuo and the residue recrystallized from Skellysolve V to give about 104 g. of product, M.P. about 113.5–114°.

EXAMPLE 2

5,11-dihydrodibenz[b,e][1,4]oxazepine 2.65 g. of 2-(o-bromobenzyloxy)formanilide and 0.88 g. of sodium ethylene glycolate in 40 ml. of ethylene glycol are held at 100° C. for two hours, yielding 85% of 5,11-dihydrodibenz[b,e][1,4]oxazepine.

EXAMPLE 3

5-(3-dimethylaminopropyl)-5,11-dihydrodibenz[b,e][1,4]oxazepine

A stirred mixture of 8.0 g. of 5,11-dihydrodibenz[b,e][1,4]oxazepine, 2.3 g. of a 50% sodium hydride dispersion in mineral oil, and 200 ml. of dry xylene is heated under reflux for one hour and cooled. 7.3 g. of 3-dimethylaminopropyl chloride is then added dropwise and the resulting mixture is heated under reflux for five hours. The reaction mixture is then filtered, cooled and extracted with two 200 ml. portions of 5% hydrochloric acid. The combined acid extracts are made strongly basic with solid potassium carbonate and extracted with ether. After drying, the ether is removed to give about 13.3 g. of residue. Distillation gives a viscous yellow oil, B.P. about 138–143° (0.15 mm.).

EXAMPLE 4

5-(3-dimethylaminopropyl)-5,11-dihydrodibenz]b,e][1,4]oxazepine hydrochloride

To 2.92 g. of distilled 5-(3-dimethylaminopropyl)-5,11-dihydrodibenz[b,e][1,4]oxazepine in 30 ml. of dry ether is added dropwise, with ice cooling, a solution of 0.37 g. of dry hydrogen chloride in 10 ml. of dry ether. The precipitate which forms is allowe to granulate and then rapidly filtered under anhydrous conditions. The hydroscopic product is freed of solvent in vacuo to give 5-(3-dimethylaminopropyl) - 5,11 - dihydrodibenz[b,e][1,4]oxazepine hydrochloride as a white crystalline product, M.P. about 156–157°.

EXAMPLE 5

5,11-dihydro-5-(1-methyl-3-piperidylmethyl)dibenz[b,e][1,4]oxazepine

A stirred mixture of 9.9 g. of 5,11-dihydrodibenz[b,e][1,4]oxazepine in 75 ml. of dimethyl sulfoxide is treated with 2.81 g. of a 50% sodium hydride dispersion and 11.1 g. of 1-methyl-3-piperidylmethyl chloride and the whole heated for two hours at 100°. From this mixture is obtained 11.3 g. of 5,11-dihydro-5-(1-methyl-3-piperidylmethyl)dibenz[b,e][1,4]oxazepine, B.P. about 194–6° (0.4 mm.).

EXAMPLE 6

10-(3-dimethylaminopropyl)phenoxazine (a) By substituting 2.92 g. of 2-(o-bromophenoxy)formanilide for the 2-(o-bromobenzyloxy)formanilide and 1.0 g. of sodium ethylene glycolate for the reactants in Example 2, there is obtained 90% for phenoxazine, M.P. 156°.

The 2-(o-bromophenoxy)formanilide is prepared by conventional procedures starting with the reaction between o-bromophenol and o-bromonitrobenzene to give o-bromophenyl o-nitrophenyl ether, followed by reduction of the nitro ether to the amino derivative, and formylation.

(b) A mixture of 3.66 g. of phenoxazine, 0.44 g. of sodamide and 50 ml. of dry toluene are refluxed for four hours to give 82% of 10-(3-dimethylaminopropyl)phenoxazine.

EXAMPLE 7

5-(3-dimethylaminopropyl)-5,11-dihydrodibenz[b,e][1,4]thiazepine (a) By substituting 3.22 g. of 2-(o-bromobenzylthio)formanilide and 1.0 g. of sodium ethylene glycolate for the reactants in Example 2, there is obtained 79% of 5,11-dihydrodibenz[b,e][1,4]thiazepine.

The 2-(o-bromobenzylthio)formanilide is prepared by conventional procedures starting with the reaction between o-bromobenzyl bromide and o-nitrothiophenol to give o-bromobenzyl o-nitrophenyl sulfide, followed by the reduction of the nitro sulfide to the amino derivative, and formylation.

(b) By substituting 9.5 g. of the product from (a) for the 5,11-dihydrodibenz[b,e][1,4]oxazepine and 7.3 g. of 3-dimethylaminopropyl chloride for the 1-methyl-3-piperidylmethyl chloride in Example 5, there is obtained 12.8 g. 5-(3-dimethylaminopropyl)-5,11 - dihydrodibenz[b,e][1,4]thiazepine.

EXAMPLE 8

12-(3-dimethylaminopropyl)-7,12-dihydro-5H-dibenz[c,f][1,5]-oxazocine (a) By substituting 3.20 g. of 2-(o-bromobenzyloxymethyl)-formanilide and 1.0 g. of sodium ethylene glycolate for the reactants in Example 2, there is obtained 86% of 7,12-dihydro-5H-dibenz[c,f][1,5]oxazocine.

The 2-(o-bromobenzyloxymethyl)formanilide is prepared by conventional procedures starting with the reaction between o-bromobenzyl bromide and o-nitrobenzyl alcohol to give o-bromobenzyl o-nitrobenzyl ether, followed by the reduction of the nitro ether to the amino derivative, and formylation.

(b) By substituting 9.5 g. of the product from (a) for the 5,11-dihydrodibenz[b,e][1,4]oxazepine and 7.3 g. of 3-dimethylaminopropyl chloride for the 1-methyl-3-piperidylmethyl chloride in Example 5, there is obtained 10.7 g. of 12-(3-dimethylaminopropyl) - 7,12-dihydro-5H-dibenz[c,f][1,5]oxazocine.

EXAMPLE 9

12-(3-dimethylaminopropyl)-7,12-dihydro-5H-dibenz[c,f][1,5]thiazocine (a) By substituting 3.36 g. of 2-(o-bromobenzylthiomethyl)-formanilide for the 2-(o-bromobenzyloxymethyl)formanilide in Example 8(a), there is obtained 7,12-dihydro-5H-dibenz[c,f][1,5]thiazocine.

The 2-(o-bromobenzylthiomethyl)formanilide is prepared by conventional procedures starting with the reaction between o-bromobenzyl bromide and o-nitrobenzyl mercaptan to give o-bromobenzyl o-nitrobenzyl sulfide, followed by the reduction of the nitro sulfide to the amino derivative, and formylation.

(b) By substituting 10.21 g. of the product from (a) for the 5,11-dihydrodibenz[b,e][1,4]oxazepine and 7.3 g. of 3-dimethylaminopropyl chloride for the 1-methyl-3-piperidylmethyl chloride in Example 5, there is obtained 11.3 g. of 12-(3-dimethylaminopropyl)-7,12-dihydro-5H-dibenz[c,f][1,5]thiazocine.

EXAMPLE 10

Dibenz[b,f]azepine

By substituting 2.02 g. of cis-2-(o-bromostyryl)formanilide for the 2 - (o - bromobenzyloxy)formanilide and 1.0 g. of sodium ethylene glycolate for the reactants in Example 2, there is obtained 78% dibenz[b,f]azepine.

The cis-2-(o-bromostyryl)formanilide is prepared by conventional procedures starting with the reaction between o-bromobenzaldehyde and potassium phenylacetate to give a-(o-bromobenzylidene)-o-nitrophenylacetic acid; the latter compound is decarboxylated, to give 1-(o-bromophenyl)-2-(o-nitrophenyl)ethylene; fractional crystallization of the ethylene derivative yields the cis-isomer, which is then reduced and converted to the N-formyl derivative.

EXAMPLE 11

10,11-dihydrodibenz[b,f]azepine

By substituting 2.04 g. of 2-(o-bromophenethyl)formanilide for the 2 - (o- bromobenzyloxy)formanilide and 1.0 g. of sodium ethylene glycolate for the reactants in Example 2, there is obtained 92% 10,11-dihydrodibenz [b,f]azepine.

The 2-(o-bromophenethyl)formanilide is prepared by conventional procedures starting with 1-(o-bromophenyl)-2-(o-nitrophenyl)ethylene described in Example 10, which is catalytically hydrogenated to give a mixture of products from which 1-(o-aminophenyl)-2-(o-bromophenyl)ethane is isolated by fractional crystallization and then converted to the N-formyl derivative.

EXAMPLE 12

12-(2-dimethylaminoethyl)-7,12-dihydro-6H-dibenz [b,e][1,4]oxazocine (a) By substituting 3.20 g. of 2-(o-bromophenethyl)-o-nitrophenyl ether and 1.0 g. of sodium ethylene glycolate for the reactants in Example 2, there is obtained 7,12-dihydro-6H-dibenz[b,e][1,4]oxazocine.

The 2-(o-bromophenethyl)-o-nitrophenyl ether is prepared by conventional procedures starting with the reaction between o-bromophenethyl bromide and o-nitrophenol to give o-bromophenethyl-o-nitrophenyl ether, followed by the reduction of the nitro ether to the amino derivative, and formylation.

(b) By substituting 9.5 g. of the product from (a) for the 5,11-dihydrodibenz[b,e][1,4]oxazepine and 6.45 g. of 2-dimethylaminoethyl chloride for the 1-methyl-3-piperidylmethyl chloride in Example 5, there is obtained 11.3 g. of 12-(2-dimethylaminoethyl) - 7,12 - dihydro-6H-dibenz[b,e][1,4[oxazocine.

EXAMPLE 13

12-(dimethylaminoethyl)-7,12-dihydro-6H-dibenz [b,e][1,4]thiazocine (a) By substituting 3.36 g. of 2-(o-bromophenethyl)-o-nitrophenyl sulfide and 1.0 g. of sodium ethylene glycolate for the reactants in Example 2, there is obtained 7,12-dihydro-6H-dibenz[b,e][1,4]thiazocine.

The 2-(o-bromophenethyl)-o-nitrophenyl sulfide is prepared by conventional procedures starting with the reaction between o-bromophenethyl bromide and o-nitrothiophenol to give o-bromophenethyl-o-nitrophenyl sulfide, followed by the reduction of the nitro sulfide to the amino derivative, and formylation.

(b) By substituting 9.8 g. of the product from (a) for the 5,11-dihydrodibenz[b,e][1,4]oxazepine and 6.45 g. of 2-dimethylaminoethyl chloride for the 1-methyl-3-piperidylmethyl chloride in Example 5, there is obtained 11.3 g. of 12-(2-dimethylaminoethyl)-7,12-dihydro - 6H - dibenz [b,e][1,4]thiazocine.

EXAMPLE 14

5-(2-dimethylaminoethyl)-dihydrophenazine

By substituting 3.62 g. of 2-[o-bromo-N-[2-(dimethylamino)-ethyl]anilino]-formanilide and 1.0 g. of sodium ethylene glycolate for the reactants in Example 2, there is obtained 5-(2-dimethyl-aminoethyl)dihydrophenazine.

The 2-[o-bromo-N-[2-(dimethylamino)ethyl]anilino] formanilide is prepared by conventional procedures starting with the reaction between o-bromoaniline and o-bromonitrobenzene to give o-bromo-o'-nitrodiphenylamine; the latter is treated with 2-dimethylaminoethyl chloride to give o-bromo-o'-nitro-N-(2-dimethylaminoethyl)diphenylamine, which is then reduced to the amino derivative and formylated.

The invention may be variously otherwise embodied within the scope of the appended claims.

What is claimed is:
1. A compound having the formula:

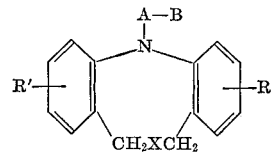

wherein R and R' are the same or different and represent hydrogen, halogen, lower alkyl, lower alkoxy, trifluoromethyl, trifluoromethylmercapto, trifluoromethoxy or N,N-dimethylsulfonamido; A is a lower alkylene radical; B is a basic saturated nitrogen containing radical of less than twelve carbons selected from the group amino; (lower alkyl)amino; di(hydroxy-lower alkyl)amino; piperidyl; (lower alkyl)piperidyl; di(lower alkyl)piperidyl; (lower alkoxy)piperidyl; pyrrolidyl; (lower alkyl) pyrrolidyl; di(lower alkyl)pyrrolidyl; (lower alkoxy)pyrrolidyl; morpholinyl; (lower alkyl)morpholinyl; di(lower alkyl)morpholinyl; (lower alkoxy)morpholinyl; thiamorpholinyl; (lower alkyl)thiamorpholinyl; di(lower alkyl) thiamorpholinyl; (lower alkoxy)thiamorpholinyl; piperazyl; (lower alkyl)piperazyl; di(lower alkyl)piperazyl; (lower alkoxy)piperazyl; (hydroxy lower alkyl)piperazyl; (lower alkanoyloxyalkyl)piperazyl; (hydroxy-lower alkoxy)piperazyl; homopiperazine; and (carbolower alkoxy)piperazyl; and X is oxo or thio.

2. A compound in accordance with claim 1 having the name 12-(3 - dimethylaminopropyl)-7,12-dihydro-5H-dibenz[c,f][1,5]oxazocine.

3. A compound in accordance with claim 1 having the name 12-(3-dimethylaminopropyl) - 7,12 - dihydro-5H-dibenz[c,f][1,5]thiazocine.

References Cited

UNITED STATES PATENTS

| 3,069,432 | 12/1962 | Yale | 260—333 |
| 3,079,400 | 2/1963 | Yale | 260—327 |

FOREIGN PATENTS

| 667,430 | 7/1963 | Canada | 260—327 |

HENRY R. JILES, Primary Examiner

C. M. SHURKO, Assistant Examiner

U.S. Cl. X.R.

260—326.5SA, 326.81, 333

PO-1050
(5/69)

UNITED STATES PATENT OFFICE
CERTIFICATE OF CORRECTION

Patent No. 3,591,604          Dated July 6, 1971

Inventor(s) Harry Louis Yale, Francis Alexander Sowinski and Jack Bernstein

It is certified that error appears in the above-identified patent and that said Letters Patent are hereby corrected as shown below:

Column 1, line 36, "carobn" should be -- carbon --;
    line 48, "loweralkyl" should be -- lower alkyl.

Column 2, first formula

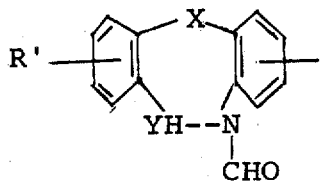   should be:   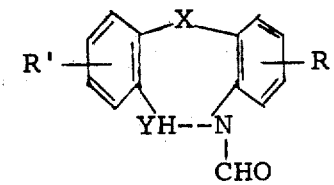

line 51, "derivative (Compounds II)" should be -- derivative, (Compounds II);

Column 3, line 40, "]b,e]" should be -- [b,e]; and
    line 46, "allowe" should be -- allowed;
    line 49, omit the hyphen between dimethylaminopropyl) and 5,11;

Column 5, lines 27, 33, 45, 50, 54, 66, "[b,e][1,4]" should be -- [c,f][1,5];

Column 6, line 44, insert "-lower alkyl)" after lower alkoxy.

Signed and sealed this 14th day of March 1972.

(SEAL)
Attest:

EDWARD M. FLETCHER, JR.
Attesting Officer

ROBERT GOTTSCHALK
Commissioner of Patents